(12) United States Patent
Lu (10) Patent No.: US 6,721,397 B1
(45) Date of Patent: Apr. 13, 2004

(54) SYSTEM AND METHOD FOR MESSAGE EXCHANGE OVER A PUBLIC-SWITCHED TELEPHONE NETWORK

(75) Inventor: Chung-Shih Lu, Marietta, GA (US)

(73) Assignee: BellSouth Intellectual Property Corporation, Wilmington, DE (US)

( * ) Notice: Subject to any disclaimer, the term of this patent is extended or adjusted under 35 U.S.C. 154(b) by 0 days.

(21) Appl. No.: 09/466,802

(22) Filed: Dec. 20, 1999

(51) Int. Cl.$^7$ .................... H04M 1/64; H04M 15/00; H04M 3/42

(52) U.S. Cl. ............... 379/88.11; 379/88.12; 379/88.19; 379/88.2; 379/127.01; 379/142.08; 379/142.1; 379/207.15; 379/215.01

(58) Field of Search ............... 379/67.1, 76, 84, 379/88.11, 88.12, 88.13, 88.19, 88.2, 88.21, 93.23, 93.35, 114.13, 127.01, 142.08, 142.1, 207.15, 215.01

(56) References Cited

U.S. PATENT DOCUMENTS

| | | | | |
|---|---|---|---|---|
| 5,327,486 A | * | 7/1994 | Wolff et al. ............... | 379/96 |
| 5,652,789 A | * | 7/1997 | Miner et al. .............. | 379/201 |
| 5,701,301 A | | 12/1997 | Weisser, Jr. .............. | 370/428 |
| 5,752,191 A | * | 5/1998 | Fuller et al. .............. | 455/445 |
| 5,774,533 A | | 6/1998 | Patel ..................... | 379/127 |
| 5,946,386 A | * | 8/1999 | Rogers et al. ............. | 379/265 |
| 6,005,870 A | * | 12/1999 | Leung et al. .............. | 370/466 |
| 6,014,427 A | * | 1/2000 | Hanson et al. ............. | 379/67.1 |
| 6,014,429 A | * | 1/2000 | LaPorta et al. ............ | 379/88.15 |
| 6,122,357 A | * | 9/2000 | Farris et al. .............. | 379/207 |
| 6,167,119 A | * | 12/2000 | Bartholomew et al. ....... | 379/88.04 |
| 6,167,261 A | * | 12/2000 | Amin ..................... | 455/426 |
| 6,304,642 B1 | * | 10/2001 | Beamish et al. ........... | 379/142.01 |
| 6,393,278 B1 | * | 5/2002 | Buchanan et al. .......... | 455/426 |
| 6,449,359 B1 | * | 9/2002 | Luzzatto et al. .......... | 379/373.01 |
| 6,459,774 B1 | * | 10/2002 | Ball et al. ............... | 379/67.1 |

OTHER PUBLICATIONS

Bellcore Technical Reference NWT–001188, Issue 1, "CLASSM Feature: Calling Name Delivery Generic Requirements," FSD 01–02–1070 (Dec. 1991).

Bellcore Technical Reference NWT–000031, Issue 4, "CLASS Feature: Calling Number Delivery," FSD 01–02–1051 (Dec. 1992).

\* cited by examiner

*Primary Examiner*—Allan Hoosain
(74) *Attorney, Agent, or Firm*—Shaw Pittman LLP (57) ABSTRACT

Telephones are able to exchange arbitrary messages over a public-witch telephone network. Messages are created and sent to a switch. The switch transfers the message to a called party telephone. The switch sends data indicative of the end of the message to the called party telephone. Computers can send messages to telephones over the PSTN in this manner as well. Messages can be sent whether the called party is using the called party telephone or otherwise unable to immediately answer the called party telephone.

55 Claims, 4 Drawing Sheets

SYSTEM AND METHOD FOR MESSAGE EXCHANGE OVER A PUBLIC-SWITCHED TELEPHONE NETWORK

BACKGROUND

1. Field of Invention

The present invention relates generally to the field of exchanging messages using telephone communication systems. More specifically, the present invention relates to sending messages from one telephone to another over a public-switched telephone network.

2. Background of the Invention

Often a person making a telephone call (the "calling party") desires to send an arbitrary message to another person (the "called party") that can be displayed to the called party while the called party is using the called party's telephone or otherwise unavailable to respond to the calling party's telephone call. For example, in the case of an emergency, it would be advantageous to send a message describing the emergency for display on the called party's telephone even when the called party is already on the telephone.

Modern pagers allow users to send text messages back and forth to one another. For example, the RIM Inter@ctive pager 950 pager, manufactured by BellSouth of Atlanta, Ga. allows users to compose text messages and send those messages to other users of the pager. However, these pagers do not use the existing public-switched telephone network ("PSTN"), nor do they send messages to a telephone. This is disadvantageous in light of the huge number of installed land-line telephones and the increasing proliferation of mobile and cellular telephones, many of which can display text and other digital messages.

Conventional telephone systems provide caller ID data which can be displayed to a called party while the called party is using the called party's telephone or otherwise unable to answer the calling party's call. The caller ID data includes the date and time of the telephone call, the calling party's telephone number and, in some cases, the identity of the calling party. The caller ID data is obtained by a switch on the telephone system, and forwarded to the called party's telephone for processing and display by a caller ID processor. The caller ID processor can be a device separate from the called party's telephone, or can be incorporated into the called party's telephone. The called party's telephone can be a mobile telephone, a cellular telephone or a land-line telephone.

Figure 1A:
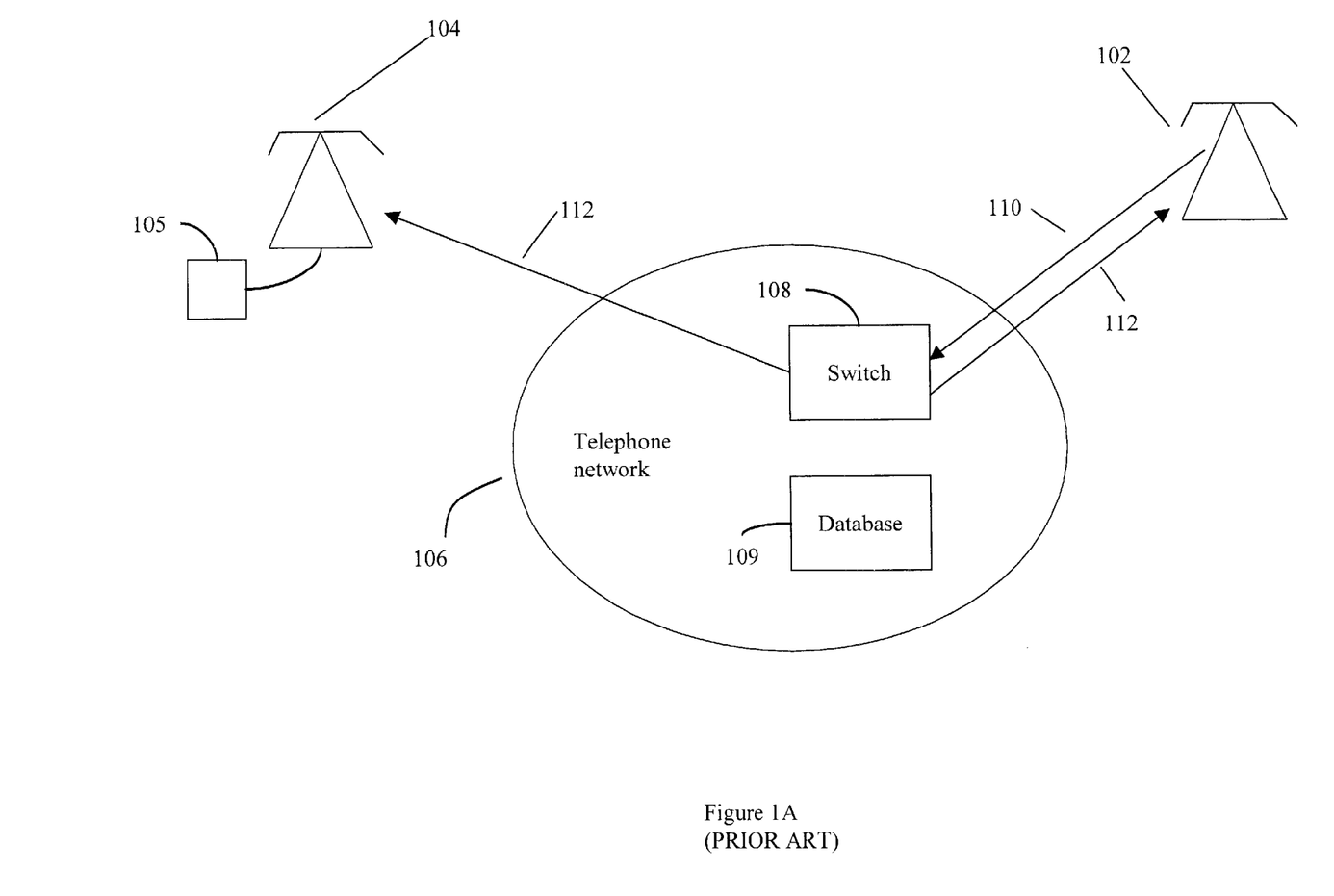
FIG. 1A is a schematic diagram illustrating a conventional telephone system for transmitting caller ID.

A schematic diagram of a system for transmitting caller ID data is shown in FIG. 1A. A calling party, using calling party telephone 102, calls a called party at called party telephone 104 over a telephone network 106. Telephone network 106 is generally a PSTN. Switch 108 in telephone network 106 makes a connection between calling party telephone 102 and called party telephone 104. When making the connection, switch 108 rings called party telephone 104. At the end of the first such ring, all or a portion of the caller ID data is displayed on a display screen of a caller ID processor 105 or other caller ID display device, for example, a computer screen.

Figure 1B:
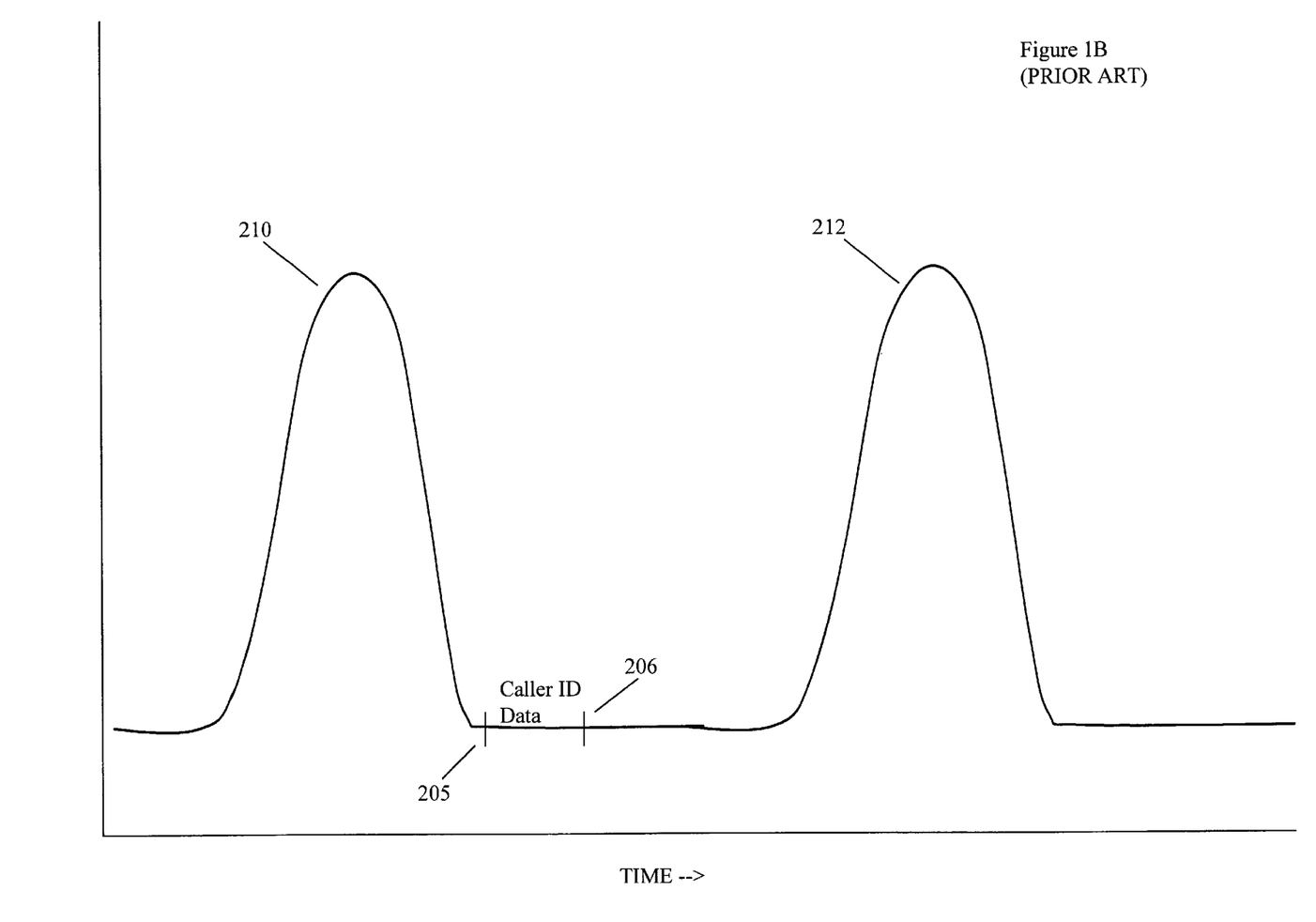
FIG. 1B is a timing diagram illustrating when caller ID data is sent from a switch to a called party.

Switch 108 sends the caller ID information to called party telephone 104 by setting up a protocol for transmitting the caller ID information with called party telephone 104 as follows. Referring to FIG. 1B, after a first ring 210 ends, switch 108 sends a header 205, that identifies the start of the caller ID data. Header 205 advises called party telephone 104 that switch 108 has caller ID data available. If called party telephone 104 can process the caller ID data, for example, using caller ID processor 105, which is attached to, or otherwise incorporated in, called party telephone 104, called party telephone 104 sends a message to switch 108 requesting the caller ID data. In response to this message, switch 108 sends the caller ID data to called party telephone 104 where it is processed and displayed by caller ID processor 105.

Conventionally, the caller ID data includes a PARAMETER LENGTH field, which stores a value indicating the length of the caller ID data in bytes. The end of the caller ID data is established by the value stored in the PARAMETER LENGTH field of the caller ID data. The end of the caller ID data is shown on FIG. 1B as end-of-caller ID 206. Caller ID processor 105 processes the caller ID data until it reaches end-of-caller ID 206, and displays the data in a screen of caller ID processor 105. Generic requirements for switching and signaling for caller ID data processing are described in further detail in Bell Communications Research Inc. (BellCore, now Telcordia Technologies) technical references TR-NWT-000031 and TR-NWT-001188, both of which are hereby incorporated by reference herein in their entirety.

Certain telephones, such as the Nortel Powertouch 350 screen phone manufactured by Nortel Networks of Brampton, Ontario, Canada, allow a user to press a button that causes an announcement to be sent to the calling party indicating that the user has received the call, but is busy and cannot answer it. Further, the announcement can indicate that the called party will get back to the caller as soon as possible. The announcement is not an arbitrary message entered by the called party in response to the specific incoming call. Rather, it is a predetermined announcement that is selected by the telephone manufacturer and played back when the user pushed a particular button on the screen phone.

Disadvantageously, conventional telephones do not provide a capability to send random or arbitrary messages, for example, describing an emergency situation, from the calling party to the called party. Nor does any mechanism exist by which to achieve this desirable result in conventional systems.

SUMMARY OF THE INVENTION

The present invention solves the foregoing problems in the art by allowing an arbitrary message to be sent from one telephone to another that is processed and displayed by a message processor that is attached to, or otherwise incorporated in, the receiving party's telephone. In the preferred embodiment of the present invention, the message processor is a conventional caller ID processor.

In a preferred embodiment of the present invention, a calling party desiring to send a message to a called party inputs an arbitrary message into the calling party's telephone. The calling party telephone then sends the message to a switch where it is stored in a switch memory. The switch then coordinates with the called party's telephone to send the message to the called party's telephone. A MESSAGE LENGTH field is included in the message sent to the switch to indicate to the switch the length of the message.

In the preferred embodiment, the MESSAGE LENGTH is the PARAMETER LENGTH field of conventional caller ID described above, to which the value stored in the MESSAGE LENGTH field is added. After the addition, the value stored in the PARAMETER LENGTH field indicates the number of bytes in the message and caller ID data. In an alternate preferred embodiment, the value of the PARAMETER LENGTH field is set to a fixed length.

Preferably, the message is stored by the switch. The switch subsequently sends the message to the called party's telephone, specifically a message processor, such as a caller ID processor for display to the called party. The message is displayed on a display device, for example, on the called party's caller ID processor, even when the called party is already using the called party telephone, or is otherwise unable to answer the calling party's phone call. In a preferred embodiment of the present invention, the message can be accessed remotely.

In a preferred embodiment of the present invention, the message is input by connecting the calling party telephone to a computer, which is used as the input device. In an alternative preferred embodiment of the present invention, the message is entered using the calling party telephone's keypad.

Preferably, the conventional telephone system architecture is substantially maintained by the present invention. Thus, the present invention can be easily retrofit into existing telephone networks.

Thus, one object of the present invention is to enable arbitrary messages to be sent from one telephone to another.

Another object of the present invention is to provide an exchange of arbitrary messages between telephones using conventional telephone network architectures.

Another object of the present invention is to provide an exchange of arbitrary messages between conventional telephones without requiring modification of the telephones.

Another object of the present invention is to provide an exchange of arbitrary messages between telephones even when the called party is already using the telephone or otherwise unable to immediately answer the calling party's telephone call.

Another object of the present invention to allow remote retrieval of stored messages.

These and other objects of the present invention are described in greater detail in the detailed description of the invention, the appended drawings and the attached claims.

DETAILED DESCRIPTION OF THE PREFERRED EMBODIMENTS

The present invention provides the ability to send an arbitrary message from one telephone to another (or from a computer to a telephone) over a public-switched telephone network ("PSTN"), while using a message processor to process and display the message. Preferably, the message processor is a familiar device having a familiar interface, for example, a conventional caller ID processor such as caller ID processor 105. Examples of such a conventional caller ID processor include the DM80 Call Director Display Unit manufactured by CIDCO, Inc. of Morgan Hill, Calif., the KX-TC1740B cordless telephone manufactured by Panasonic of Secaucus, N.J. and the STARTAC ST 7797 TDMA digital phone manufactured by MOTOROLA, Inc. of Schaumburg, Ill. The term "arbitrary message" as used herein refers to any original message entered by a user of a telephone, such as an alphanumeric text message.

In practice, the present invention can be used even when the called party does not answer the telephone. That is, messages are displayed to the called party even if the called party is using the called party's telephone, or otherwise is unable to answer the calling party's telephone call. Thus, if the calling party leaves a message, the called party can receive it later by going through the various received calls, for example, scrolling through received calls displayed by the caller ID processor. For example, using the present invention, a user can send the message "My car broke down. Please come get me at 1600 Pennsylvania Avenue," or "I am stuck in traffic. I will be home in 45 minutes." The message appears to the called party, even if the called party is on the telephone. Moreover, in contrast with conventional call waiting, the called party's conversation proceeds uninterrupted.

Thus, a significant feature of the present invention is that it provides significantly more useful information to the called party than is provided by conventional systems, such as caller ID. Whereas conventional caller ID systems provide only the calling party's number and, in some cases, the calling party's identity, the present invention allows the calling party to send an arbitrary message, for example, the reason for a call or the urgency of the call.

Figure 2A:
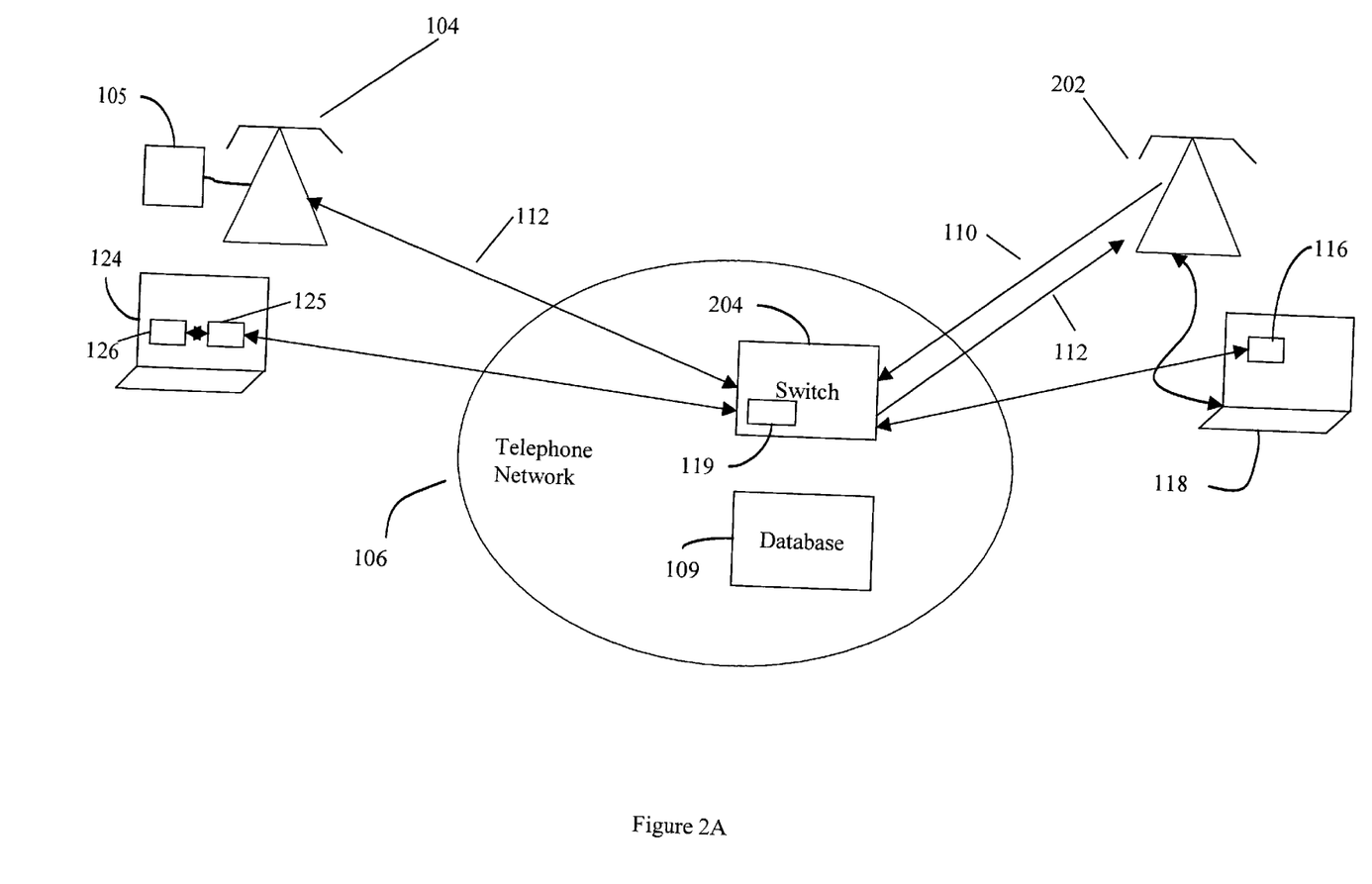
FIG. 2A is a schematic diagram illustrating a telephone system for exchanging messages between telephones according to a preferred embodiment of the present invention.

FIG. 2A is a schematic diagram illustrating a system according to a preferred embodiment of the present invention. Referring to FIG. 2A, the present invention uses an architecture virtually identical to that used for conventional caller ID systems. Thus, the present invention is easily incorporated into existing architectures without requiring substantial capital expenditures such as purchasing new components. However, several modifications are required to existing components, primarily to switch 108 (which becomes switch 204 in FIG. 2A) and, in some cases, to calling party telephone 102 (which becomes calling party telephone 202).

Calling party telephone 202 must be able to create and send an arbitrary message to switch 204. This message is subsequently sent to called party telephone 104 for display to the called party as described below. Many modern telephones can interface to a computer, for example a personal computer (PC) 118. PCs are well-known in the art and need not be described further. In a preferred embodiment, for example, calling party telephone 202 interfaces to PC 118 executing IDENTAFONE software available from NorthStar Solutions of Manhattan, Kans. Arbitrary messages are input by entering the message using PC 118, and sending the message through a modem 116 coupled to PC 118. In this embodiment, calling party telephone 202 serves provides the voice access, while PC 118 through modem 116 performs call handling operations. Modem 116 can be any modem which can interface to PC 118, including, for example, the Hayes 56K ACCURA Speakerphone modem manufactured by Hayes Microcomputer Products, Inc. of Boston, Mass. Further, many modern telephones have the ability to compose alphanumeric messages using either a keyboard or the telephone keypad.

There are several other ways to create and send messages in accordance with the present invention. For example, a calling party can create and send a message using the telephone's keypad. This is accomplished by depressing one or more keys corresponding to each character of the message. Alternatively, calling party telephone 202 is a dial pulse telephone. In this embodiment, a well-known device for converting dial pulses to FSK or DTMF signals is used to create and send the arbitrary message to switch 204.

In an alternative preferred embodiment of the present invention, calling party telephone 202 is a computer, for example PC 118. The message is created on PC 118 and forwarded, via modem 116, to switch 204 for storage in switch memory 119. In fact, any way of creating an arbitrary message and sending it to switch 204 can be used.

Once the arbitrary message is created, calling party telephone 202, PC 118, or some other device, sends the arbitrary message to switch 204 according to the following protocol. Calling party telephone 202 sends a handshake message to switch 204 indicating that it has a message to send to called party 104. Switch 204 acknowledges receipt of the handshake message from calling party telephone 102 and sends a request to calling party telephone 202 indicating it is ready to receive the message. In response to this request from switch 204, calling party telephone 202 transmits the message to switch 204. The message is appended to the caller ID data that is stored in a switch memory 119 for subsequent transmission to called party 204 as described below. As would be apparent to those skilled in the art, the protocol would be substantially similar where a PC 118 or some other device sends the arbitrary message to switch 204.

In the preferred embodiment, the length of the message in bytes is sent to switch 204 in a MESSAGE LENGTH field. It would be apparent to those skilled in the art that the MESSAGE LENGTH field can also account for the length of any housekeeping data, for example, checksum bytes used to check transmission of the message or start and stop bits. For clarity however, the description is in terms of the actual message length. The message is then appended to the caller ID data, and the value of the PARAMETER LENGTH field is increased by the value stored in the MESSAGE LENGTH field. In an alternative embodiment of the present invention, switch 204 determines the length of the message and increases the value of the PARAMETER LENGTH field accordingly.

It would be apparent to those skilled in the art how to program a telephone 202 to carry out the above-described protocol for sending a message to switch 204. This would require programming a telephone 202 to send a message to switch 204, indicating it has a message, waiting for an acknowledgement from switch 204 and sending the message to switch 108 in response to the acknowledgment.

Figure 2B:
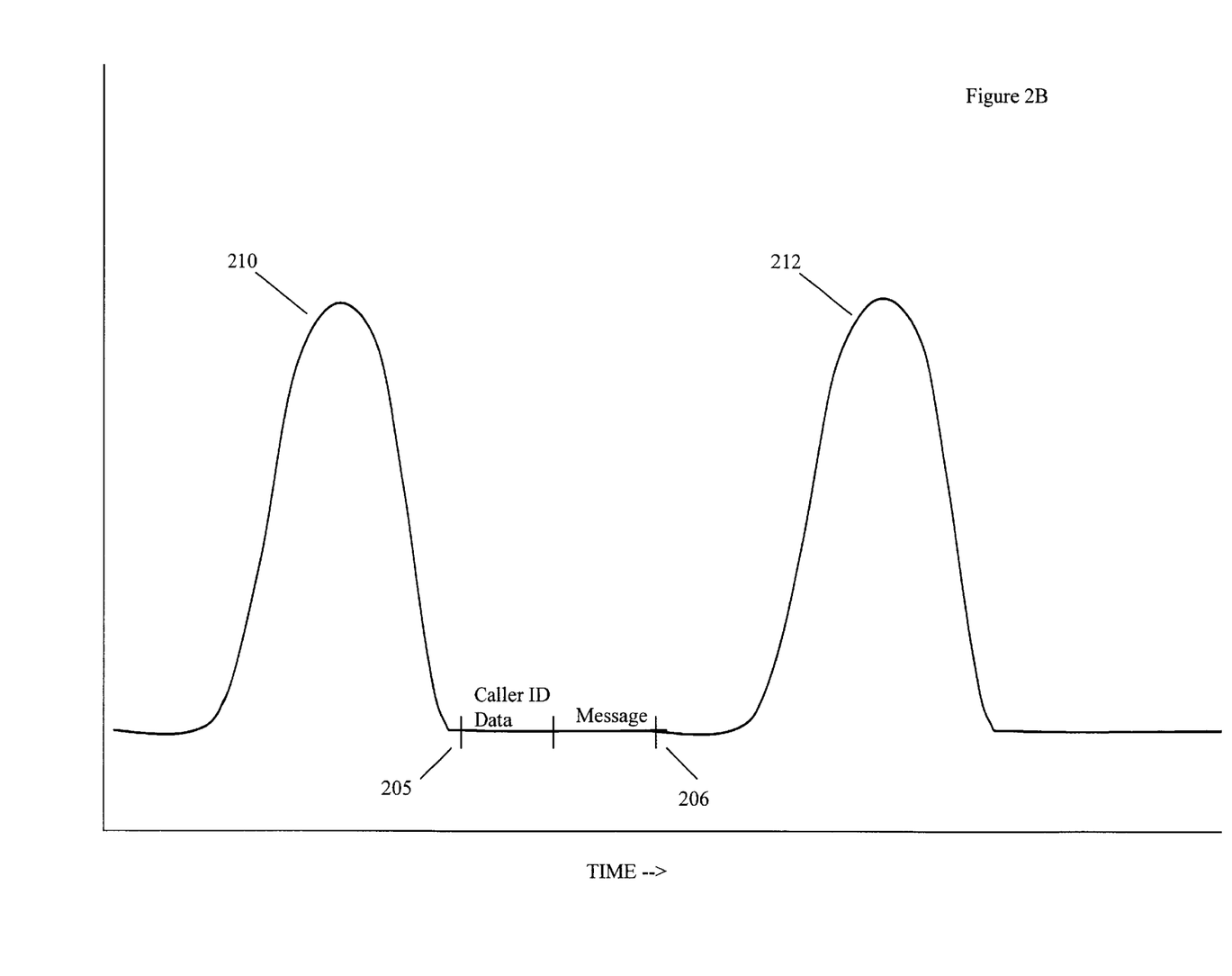
FIG. 2B is a timing diagram illustrating when messages are sent according to a preferred embodiment of the present invention.

In the preferred embodiment of the present invention, switch 204 forwards the arbitrary message to called party telephone 104 using the following protocol. Referring to FIG. 2B, after first ring 210 ends, switch 204 sends a header 205 that identifies the start of the caller ID data. Header 205 advises called party telephone 104 that switch 204 has caller ID data available. If called party telephone 104 can process the caller ID data, for example, using caller ID processor 105, which is attached to, or otherwise incorporated in, called party telephone 104, called party telephone 104 sends a message to switch 204 requesting the caller ID data. In response to this message, switch 204 sends the caller ID data to called party telephone 104 where it is processed and displayed by caller ID processor 105. Conventionally, the length of the caller ID data is fixed. Caller ID processor 205 processes caller ID data, including the message, until it reaches the end of the caller ID data, that is, until the number of bytes indicated by the value stored in the PARAMETER LENGTH field have been processed.

Because the PARAMETER LENGTH field used for sending conventional caller ID data is used, caller ID processor 105 need not be modified to implement the present invention. This is because the value stored in the PARAMETER LENGTH field includes the number of bytes required for the message. That is, caller ID processor 105 processes data as before, but now the data includes an arbitrary message. This message has been appended to the caller ID data by switch 204. Switch 204 then sends the caller ID data, and appended message data, as illustrated in FIG. 3 to called party telephone 104. Caller ID processor, attached to or incorporated in called party telephone 104, processes and displays the caller ID data and message.

Alternatively, end-of-caller ID 206 is a marker, for example, a predetermined value such as −1 that is sent by the switch to signal the end of transmission of caller ID data. It would be apparent to those skilled in the art that any indication of the end of the arbitrary message can be used within the scope and spirit of the present invention.

In a preferred embodiment of the present invention, one or more delimiter characters are automatically inserted to the start of the message. Exemplary delimiter characters are, for example, a dash "-" or a space " ". The delimiter character or characters are placed immediately before the message so that the message is delimited from the caller ID data on the display of caller ID processor 105.

As described above, in the preferred embodiment of the present invention, message data is placed just after the caller ID data and any delimiter characters that are sent, but before the second ring. Thus, the message must be of a length that fits between first ring 210 and second ring 212, including any caller ID data, and any delimiting characters. For example, short message service (SMS) messages, having a length of up to 256 characters can be used. The length of the message is dependent on the bandwidth of the channel between switch 204 and called party telephone 104, and can be greater than the lengths mentioned above.

In an alternative embodiment of the present invention, called party telephone 104 is a computer 124 having a modem 125. In this embodiment, computer 124 receives the arbitrary message from switch 204 via its modem 125. Computer 124 has a caller ID processor 126 which accepts data from modem 125 to process and display the arbitrary message using the protocols described above. The arbitrary message can be displayed on a computer screen of computer 124 in a well-known manner, for example, using pop-up window in which the arbitrary message is displayed.

In an alternative preferred embodiment of the present invention, no caller ID data is sent. However, called party phone 104 can still request and display a digital message directed to it. In this embodiment, switch 204 sends a handshaking message to called party telephone 104 indication that it has a message to send. In a preferred embodiment of the present invention, this message corresponds to a similar message sent in conventional caller ID systems whereby the switch advises the called party that it has caller ID data to send to the called party. Called party telephone 104 acknowledges the handshaking message. If called party telephone 104 can process the digital message, it sends a request to switch 204 requesting that the message be sent. Upon receiving this request, switch 104 sends the message to called party telephone 104, where it is displayed to the called party.

Preferably, messages are composed in full prior to sending. That is, rather than keying in a message one character at a time during a call, the calling party 202 composes the entire message and stores it in memory in calling party telephone 202. In a preferred embodiment, this is done using PC 118. The message is composed on PC 118 and downloaded to calling party telephone 202, or sent by PC 118 to switch 204 through its modem.

The message sender can also send a message type. Alternatively, message type can automatically be assigned, for example, by default based on user ID. In a preferred embodiment, the message type is sent as an extra byte appended to the message, thus requiring the MESSAGE LENGTH field to be incremented by 1 to allow the extra byte to be sent. Example message types include residential (for messages, left by family or friends) and commercial (for messaged left by advertisers). In an alternate preferred embodiment, caller ID processor 105 assigns message type based on caller ID of the incoming call. In the alternate preferred embodiment, no extra byte for message types is required.

Conventionally, FSK is used by the switch to talk communicate with the telephone over path 114. The present invention requires the telephone to communicate with the switch over path 110. Preferably this path is also FSK. That is, the preferred embodiment of the present invention uses two-way FSK to set up the protocols required to coordinate message sending as well as to send the message itself In addition, the present invention provides a way of accessing the messages remotely. Conventional caller ID processors, such as caller ID processor 105, allow remote retrieval and playback of caller ID messages stored thereon. Using the same protocols used to retrieve and playback caller ID messages from conventional caller ID processors, a user of the present invention can retrieve the caller ID and additional messages enabled by the present invention.

The present invention is also advantageous over conventional answering machines because, the message is stored in called ID processor 105, even if the person does not wish to leave a message on an answering machine. This is because the called party knows that the calling party did not leave a message as well as the identity of the calling party.

The foregoing disclosure of embodiments of the present invention has been presented for purposes of illustration and description. It is not intended to be exhaustive or to limit the invention to the precise forms disclosed. Many variations and modifications of the embodiments described herein will be obvious to one of ordinary skill in the art in light of the above disclosure. The scope of the invention is to be defined only by the claims appended hereto, and by their equivalents.

What is claimed is:

1. A method for exchanging an original message between a calling party device and a called party device comprising the steps of:
   (a) creating The original 1 message by a calling party using the calling party device;
   (b) sending the original message to a switch;
   (c) storing the original message in said switch;
   (d) sending the original message created by the calling party from said switch to a called party device in a caller ID message; and
   (e) displaying the original message to a called party.

2. The method recited in claim 1, further comprising the step of increasing a value corresponding to a length of caller ID data associated with a telephone call being placed by a calling party by an amount corresponding to a length of the original message.

3. The method recited in claim 1, further comprising the step of remotely accessing the original message.

4. The method recited in claim 1, further comprising the step of generating the original message using a personal computer.

5. The method recited in claim 4, further comprising the steps of: establishing a communication path between said personal computer and said switch; and sending said original message across said communication path.

6. The method recited in claim 1, further comprising the step of generating said message using a keypad on said calling party device.

7. The method recited in claim 1, further comprising the step of using a caller ID processor to display the original message.

8. The method recited in claim 1, wherein said calling party device is a telephone.

9. The method recited in claim 1, wherein said called party device is a telephone.

10. A system for transmitting an on an original message from a calling party to a called party, comprising the steps of:
   (a) a calling party device on which the calling party creates and sends the original message;
   (b) a switch for receiving the original message from said calling party device;
   (c) a called party device;
   (d) a message processor connected to, or incorporated in, said called parry device that receives the original message created by the calling party from said switch in a caller ID message, processes it, and displays it to the called party.

11. The system recited in claim 10, wherein said calling party device sends a handshaking message to said switch indicating that it has an original message to send to said switch and said switch sends a request to said calling party device requesting the original message be sent to said switch whereupon it is stored in a switch memory.

12. The system recited in claim 11, wherein said switch sends a second handshaking message to said called part device in response to which said called party device sends a second request to said switch for said original message, said switch sending said original message to said called party device where it is processed and displayed by said message processor.

13. The system recited in claim 12, wherein said message processor is a caller ID processor, further comprising:
   a first field to store a first value corresponding to a length of the original message; and
   a second field to store a value corresponding to a length of caller ID data associated with a telephone call being placed by the calling party, wherein said first value is added to said second value and stored in said second field.

14. The system recited in claim 10, wherein the called party accesses said original message remotely.

15. The system recited in claim 10, wherein said calling party device comprises a personal computer on which said original message is generated.

16. The system recited in claim 15, wherein said calling party device comprises said personal computer on which original message is generated and said personal computer comprises means for communicating with said switch through a modem to send said original message to said switch.

17. The system recited in claim 10, wherein said calling party device is a telephone.

18. The system recited in claim 10, wherein said called party device is a telephone.

19. The method recited in claim 10, wherein the original message does not include calling party name data.

20. A switch in a public-switched telephone network, comprising:
   receiving means for receiving an original message from a calling party device;
   a memory for storing said original message; and
   sending means for sending said original message created by the calling party to a called party device in a caller ID message.

21. The switch recited in claim 20, wherein said sending means comprises:
   means for sending a handshaking message to said called party device indicating it has a message for said called party.
   means for receiving a request for said original message from said called party device; and
   means for sending said original message to said called party device in response to said request.

22. The switch recited in claim 20, wherein said receiving means comprises:
   means for acknowledging a handshake message from said calling party device indicating that said calling party device has a message to send to said called party;
   mean for receiving said original message form said calling party device; and
   means for storing said original message in a switch memory.

23. The switch recited in claim 20, further comprising means for adding a value indicating a length of the original message to a value indicating a length of caller ID data associated with a telephone call being placed by a calling party using the calling party device.

24. The switch recited in claim 23, wherein the original message is appended lo data corresponding to caller ID data obtained by the switch.

25. The method recited in claim 20, wherein the original message does not include calling party name data.

26. A switch for use in a telephone network comprising a memory for storing an original message received from a calling party device as a stored original message, the switch then sending the stored original message created using the calling party device to a called party device in a caller ID message, where the stored original message is displayed to a called party.

27. The switch recited in claim 26, wherein the switch obtains caller ID data corresponding to a calling party and stores the caller ID data as stored called ID data and appends the stored original message to the stored caller ID data.

28. The switch recited in claim 27, wherein the switch increases a stored length of the caller ID data by an amount corresponding to the length of the original message.

29. The switch recited in claim 26, wherein the switch uses a first protocol to receive the original message from the calling party device, and uses a second protocol to send the original message to the called party device.

30. A telephone network in which a calling party sends an original message to a called panty, comprising:
   a calling party device on which the original message is created;
   a switch to which the calling party device sends the original message;
   a called party device for receiving the original message; and
   a display device for displaying on the called party device the original message created by the calling party on the calling party device in a caller ID message.

31. The telephone network recited in claim 30, wherein said switch stores the original message in addition to caller ID data and sends the caller ID data and original message to the called party device for display to the called party.

32. The telephone network recited in claim 31, wherein the switch appends the original message to the caller ID data and stores a length value corresponding to a length of the stored caller ID data and original message.

33. The telephone network of claim 32, wherein said switch transmits said length value to the called party device, and the called party device uses the length value so transmitted to display the caller ID data and original message to the called party.

34. The telephone network of claim 30, wherein said called party device is a telephone.

35. The telephone network of claim 30, wherein said calling party is a telephone.

36. The telephone network of claim 30, wherein said calling party device comprises a personal computer.

37. The telephone network of claim 30, wherein said called party device comprises a personal computer.

38. The method recited in claim 30, wherein the original message does not include calling party name data.

39. A system for displaying an original message sent by a calling party, comprising:
   a calling party telephone on which a calling party creates the original message;
   a switch to receive and store the message;
   a called party device to receive the message from the switch in a caller ID message and display the message created by the calling party to a called party using the called party device between a first and a second ring of the called party device.

40. The system recited in claim 39, further comprising a message length parameter for storing a length of the original message.

41. The system recited in claim 39, further comprising an end-of-message indication that is appended to the original message.

42. The system recited in claim 39, wherein the original message does not include calling party name data.

43. A system displaying an original message sent by a calling party, comprising:
   a calling party telephone on which a calling par creates the original message;
   a switch to receive and store the message;
   a called party device to receive and the message from the switch in a caller ID message and display the message created by the calling party to a called party using the called party device between a first and a second ring of the called party device, wherein the called party device comprises a caller ID processor, and wherein the length of the message stored in a message length parameter is added to a length of a parameter length field for storing a length of the a caller ID message.

44. A method for transmitting an original message from a calling party device to a called party device on which the original message can be displayed, comprising the steps of:
   (a) creating the original message on the calling party device;
   (b) sending the original message to a first switch servicing the calling party device;

(c) storing the original message created on the calling party device in the first switch;

(d) sending the original message stored on the first switch to a second switch servicing the called party device;

(e) storing the original message on the second switch;

(f) sending the original message from the second switch to the called party device in a caller ID message; and (g) displaying the original message to a called party.

45. The method recited in claim 44, further comprising the step of increasing a value corresponding to a length of caller ID data associated with a telephone call being placed by a calling party by an amount corresponding to a length of the original message.

46. The method recited in claim 44, further comprising the step of accessing the original message remotely.

47. The method recited in claim 44, further comprising the step of displaying the message on the called party device while a called party is talking on a telephone associated with the called party device.

48. The method recited in claim 44, further comprising the step of displaying the original message on the called party device while a called party is not talking on a telephone associated with the called party device.

49. A system for sending an original message from a calling party to a called party, comprising:

a calling party device an which the calling party creates and sends the original message;

a first switch serving the calling party device that receives the original message created by the calling party;

a second switch servicing the called party device that receives the original message created by the calling party from the first switch and sends the message to the called party device;

a called party device on which the original message received by the second switch is displayed to the called party; and a message processor connected to, or incorporated in, said called party device that receives the original message from the second switch and displays it to the called party in a caller ID message.

50. The system recited in claim 49, further wherein the second switch increases a value corresponding to a length of caller ID data associated with a telephone call being placed by a calling party by an amount corresponding to a length of the original message.

51. The system recited in claim 49, wherein the called party device displays the message when the called party is using a telephone associated with the called part device.

52. The system recited in claim 49, wherein the called party device displays the message when the called party is not using a telephone associated with the called party device.

53. The system recited in claim 49, wherein the calling party device is a telephone.

54. The system recited in claim 49, wherein the calling party device is a person computer.

55. The method recited in claim 1, wherein the original message does not include calling party name data.

* * * * *